US012693947B2

(12) United States Patent
Sakamoto et al.

(10) Patent No.: US 12,693,947 B2
(45) Date of Patent: Jul. 28, 2026

(54) CONTROL DEVICE AND METHOD FOR REWRITING CONTROL PROGRAM

(71) Applicant: FDK CORPORATION, Tokyo (JP)

(72) Inventors: Jinichi Sakamoto, Tokyo (JP); Yusuke Kusagaya, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 17/758,995

(22) PCT Filed: Feb. 16, 2021

(86) PCT No.: PCT/JP2021/005659
§ 371 (c)(1),
(2) Date: Jul. 18, 2022

(87) PCT Pub. No.: WO2021/186987
PCT Pub. Date: Sep. 23, 2021

(65) Prior Publication Data
US 2023/0035670 A1 Feb. 2, 2023

(30) Foreign Application Priority Data

Mar. 16, 2020 (JP) ................................. 2020-045471

(51) Int. Cl.
*G06F 11/00* (2006.01)
*G06F 8/65* (2018.01)
*G06F 11/20* (2006.01)

(52) U.S. Cl.
CPC ............ *G06F 11/2017* (2013.01); *G06F 8/65* (2013.01); *G06F 11/008* (2013.01); *G06F 11/2023* (2013.01)

(58) Field of Classification Search
CPC ...... G06F 8/65; G06F 11/008; G06F 11/2023; G06F 11/2017
See application file for complete search history.

(56) References Cited

U.S. PATENT DOCUMENTS

| 6,865,670 B2 * | 3/2005 | Yu ............................. G06F 9/24 |
| | | 712/E9.007 |
| 6,928,108 B2 * | 8/2005 | Nelson ...................... H04L 9/40 |
| | | 717/172 |

(Continued)

FOREIGN PATENT DOCUMENTS

| JP | H0855068 A | 2/1996 |
| JP | H1063497 A | 3/1998 |

(Continued)

OTHER PUBLICATIONS

International Search Report and Written Opinion dated Mar. 30, 2021, for corresponding PCT Application No. PCT/JP2021/005659.

(Continued)

*Primary Examiner* — Loan L.T. Truong
(74) *Attorney, Agent, or Firm* — Kinney & Lange, P.A.

(57) ABSTRACT
A control unit is configured to determine success or failure of a rewrite process after end of the rewrite process, and write success or failure display data into a success or failure determination result storage area in accordance with the success or failure, and read the success or failure display data present in the success or failure determination result storage area after startup of an electronic device, and execute a control program, in lieu of carrying out the rewrite process, when it is determined that the success or failure display data indicate a success of the rewrite process.

7 Claims, 2 Drawing Sheets

(56) References Cited

U.S. PATENT DOCUMENTS

| | | | | |
|---|---|---|---|---|
| 6,944,757 | B2* | 9/2005 | Wilks | G06F 9/4406 |
| | | | | 713/1 |
| 9,448,785 | B1* | 9/2016 | Alexeev | G06F 12/1408 |
| 9,678,761 | B2* | 6/2017 | Venkiteswaran | G06F 12/0246 |
| 9,916,029 | B2* | 3/2018 | Matsubara | G06F 8/656 |
| 10,133,615 | B2* | 11/2018 | Hembram | G06F 9/5072 |
| 11,650,906 | B2* | 5/2023 | Creel | G06F 11/3612 |
| | | | | 717/130 |
| 2002/0066009 | A1* | 5/2002 | Tung | G06F 11/1433 |
| | | | | 713/1 |
| 2003/0182547 | A1* | 9/2003 | Kumagai | G06F 11/1438 |
| | | | | 711/112 |
| 2004/0098446 | A1* | 5/2004 | Styles | H04L 67/75 |
| | | | | 709/200 |
| 2004/0236932 | A1* | 11/2004 | Zhang | G06F 8/65 |
| | | | | 713/1 |
| 2006/0080051 | A1* | 4/2006 | Breen | H02J 7/0068 |
| | | | | 702/60 |
| 2006/0080522 | A1* | 4/2006 | Button | G06F 21/575 |
| | | | | 713/2 |
| 2008/0320471 | A1* | 12/2008 | Maeda | G05B 19/406 |
| | | | | 717/178 |
| 2012/0191960 | A1* | 7/2012 | Piwonka | G06F 9/441 |
| | | | | 713/2 |
| 2012/0254487 | A1* | 10/2012 | Takamizawa | G06F 9/4411 |
| | | | | 710/65 |
| 2012/0303874 | A1* | 11/2012 | Yamaguchi | G06F 12/1009 |
| | | | | 711/E12.008 |
| 2013/0191622 | A1* | 7/2013 | Sasaki | G06F 9/4401 |
| | | | | 713/2 |
| 2018/0181433 | A1* | 6/2018 | Emperle | G06F 11/0715 |
| 2020/0023862 | A1* | 1/2020 | Rodriguez Bravo | G07C 9/38 |
| 2020/0057629 | A1* | 2/2020 | Samuel | G06F 8/654 |
| 2020/0114927 | A1* | 4/2020 | Yokota | G06F 8/65 |
| 2020/0249938 | A1* | 8/2020 | Shin | G06F 8/65 |
| 2020/0285544 | A1* | 9/2020 | Ma | G06F 9/4401 |
| 2020/0296794 | A1* | 9/2020 | Park | H04W 88/02 |
| 2021/0034352 | A1* | 2/2021 | Arrive | G06F 8/65 |
| 2021/0034354 | A1* | 2/2021 | Lee | G06F 11/1433 |
| 2021/0072971 | A1* | 3/2021 | Jeong | G06F 9/4451 |
| 2021/0240484 | A1* | 8/2021 | Vidyadhara | G06F 8/65 |
| 2021/0334399 | A1* | 10/2021 | Wright | G06F 21/6218 |
| 2022/0137947 | A1* | 5/2022 | Jang | G06F 8/71 |
| | | | | 717/169 |

FOREIGN PATENT DOCUMENTS

| | | |
|---|---|---|
| JP | 2004318933 A | 11/2004 |
| JP | 2009026183 A | 2/2009 |
| JP | 2009134563 A | 6/2009 |
| JP | 2009271737 A | 11/2009 |
| JP | 2012169876 A | 9/2012 |
| JP | 2013142914 A | 7/2013 |

OTHER PUBLICATIONS

Extended European Search Report dated Feb. 9, 2024, for corresponding European Application No. 27110773.6.

* cited by examiner

TO EXTERNAL APPARATUS EA

GND

TO EXTERNAL APPARATUS EA

CONTROL DEVICE AND METHOD FOR REWRITING CONTROL PROGRAM

CROSS-REFERENCE TO RELATED APPLICATION(S)

This application is the national phase of PCT Application No. PCT/JP2021/005659 filed on Feb. 16, 2021, which claims priority to Japanese Application No. 2020-045471 filed Mar. 16, 2020, the contents of which are incorporated herein by reference in their entirety.

BACKGROUND

Technical Field

The present disclosure relates to a control device and a method for rewriting a control program.

Background Art

In recent years, a control device such as a microprocessor mounted on an electronic device is provided with a storage device capable of storing a control program for controlling an operation of the electronic device, as shown in Patent Documents 1 to 3 listed below, which enables the control program to be rewritten. The control device executes a confirmation operation for confirming whether or not rewriting of the control program has been performed in a normal manner each time the electronic device is started up. Reasons for executing the confirmation operation include that the control program may not be rewritten in a normal manner due to factors such as a power supply being cut off and a communication failure occurring during the rewriting of the control program. In such a case, it is necessary to execute the rewriting of the control program again. However, a problem is that performing the confirmation operation each time the electronic device is started up causes the startup of the electronic device to delay due to the confirmation operation.

PRIOR ART DOCUMENT

Patent Document

Patent Document 1: Japanese Patent Laid-Open Publication No. 2004-318933
Patent Document 2: Japanese Patent Laid-Open Publication No. 08-055068
Patent Document 3: Japanese Patent Laid-Open Publication No. 10-063497

SUMMARY

An object of the present disclosure, which has been made in consideration of such circumstances, is to provide a control device and a method for rewriting a control program capable of executing rewriting of the control program more flexibly while suppressing a delay in startup due to the above confirmation operation.

The present disclosure has been made to solve at least a part of the problems described above, and can be realized as the following aspects.

A control device according to the present aspect is provided with a control unit configured to control an operation of an electronic device to be controlled by executing a control program, a storage unit configured to store the control program, and a communication unit configured to receive an update program from outside, in which the control unit can execute a rewrite process of rewriting the control program stored in the storage unit into the update program received via the communication unit, the storage unit includes a success or failure determination result storage area for storing success or failure display data that indicate success or failure of the rewrite process, and the control unit is configured to determine the success or failure of the rewrite process after end of the rewrite process, and write the success or failure display data into the success or failure determination result storage area in accordance with the success or failure, and read the success or failure display data present in the success or failure determination result storage area after startup of the electronic device, and execute the control program, in lieu of carrying out the rewrite process, when it is determined that the success or failure display data indicate a success of the rewrite process.

According to the above configuration, the control device according to the present aspect can omit the rewrite process and a process such as checksum of the control program in accordance with the success or failure display data, thereby making it possible to realize a high-speed startup of the electronic device.

A method for rewriting a control program according to the present aspect is the method for rewriting the control program stored in a storage unit for controlling an operation of an electronic device, which includes a first step of determining whether or not there is an instruction to execute rewriting of the control program, a second step of rewriting the control program into an update program, a third step of determining a success or failure of the rewriting of the control program into the update program, a fourth step of writing success or failure display data indicating the success or failure of the rewriting into a success or failure determination result storage area provided in the storage unit in accordance with the success or failure of the rewriting, and a fifth step of reading the success or failure display data present in the success or failure determination result storage area, in which, after startup of the electronic device, the fifth step is immediately carried out if it is determined that there is no instruction to execute the rewrite process in the first step, and the control program is executed without passing through the second to fourth steps if it is determined that the success or failure display data indicate a success of the rewrite process in the fifth step.

As a result, the method for rewriting the control program according to the present aspect can omit the rewrite process and the process such as checksum of the control program in accordance with the success or failure display data, thereby making it possible to realize the high-speed startup of the electronic device.

The control device and the method for rewriting the control program according to the present aspect can execute the rewriting of the control program more flexibly while suppressing the delay in the startup due to the above confirmation operation.

DETAILED DESCRIPTION

Hereinafter, a control device and a method for rewriting a control program according to an embodiment will be described with reference to the drawings. It should be noted that the present embodiment is not limited to the contents described below, and can be arbitrarily modified and implemented without changing the gist thereof. In addition, the drawings used for explaining the embodiment are all schematically showing the constituent members, and are partially emphasized, enlarged, reduced, or omitted in order to deepen the understanding, and the scale, shape and the like of the constituent members may not be accurately represented.

Structure

Figure 1:
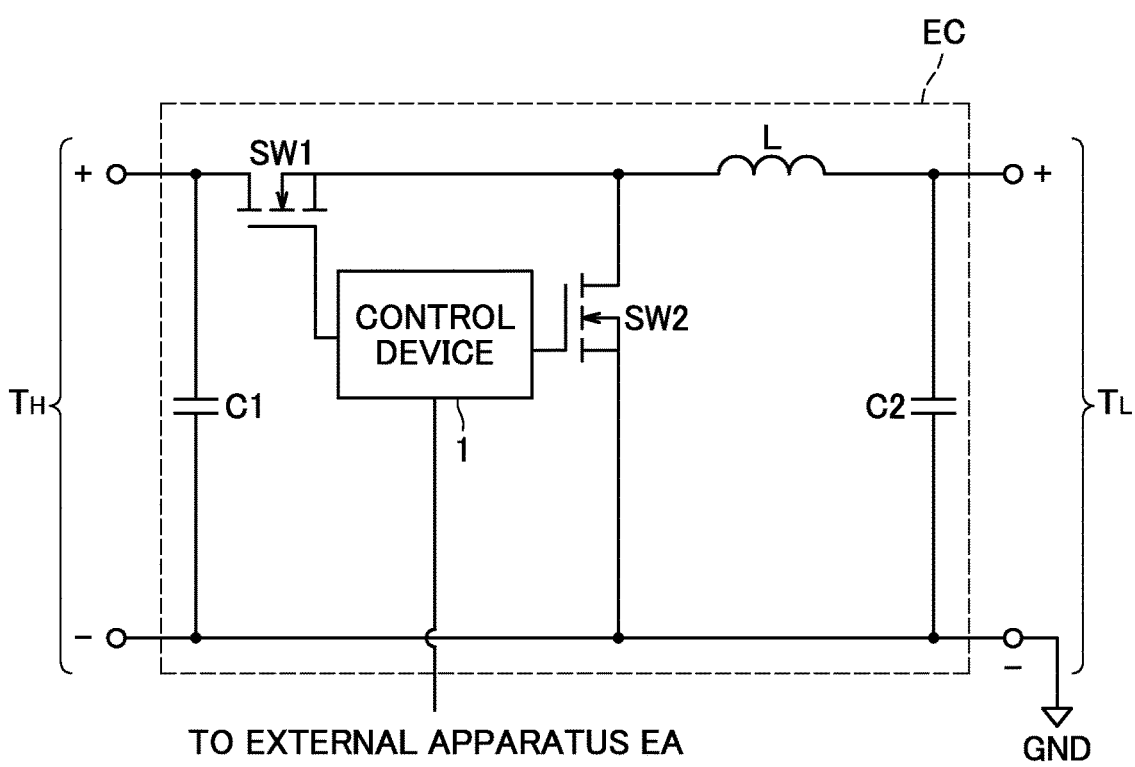
FIG. 1 is a circuit diagram showing an electronic circuit provided with the control device according to the present embodiment.

First, a control device 1 according to the present embodiment will be described with reference to FIGS. 1 and 2. FIG. 1 is a circuit diagram showing an electronic circuit EC provided with the control device 1 according to the present embodiment. The control device 1 shown in FIG. 1 controls an operation of an electronic device (not shown) to be controlled by executing a control program stored inside. The control device 1 according to the present embodiment is provided, for example, in the electronic circuit EC mounted on the electronic device. The control device 1 shown in FIG. 1 is provided in the electronic circuit EC mounted on a generally known electronic device or the like such as a power storage device (including a battery pack), a power supply device, a home appliance, an industrial PC, a server, a mobile phone, or a wireless router. More specifically, the control program is a program for controlling charging and discharging of a battery pack (a secondary battery) provided in the electronic device.

Here, the control device 1 can rewrite the control program stored inside into a control program stored in an external apparatus EA. The control program stored in the external apparatus EA (not shown) is, for example, a control program for update (hereinafter, referred to as an update program). The update program includes a version of a control program released after the current control program or a version of a control program released before the current control program. The version of a control program released before the current control program is used, for example, as a rewrite program when there is a problem with the current control program.

Further, the electronic circuit EC shown in FIG. 1 is a bidirectional converter that converts a voltage input from either one of a first input/output end $T_H$ and a second input/output end $T_L$ under the control of the control device 1 and outputs the converted voltage from the other one. The electronic circuit EC is composed of circuit elements such as a switching element SW1 on the high side, a coil L, a switching element SW2 on the low side, a first capacitor C1, and a second capacitor C2. Of the circuit element, the control device 1 controls an on/off operation of the switching element SW1 on the high side and that of the switching element SW2 on the low side, respectively.

Figure 2:
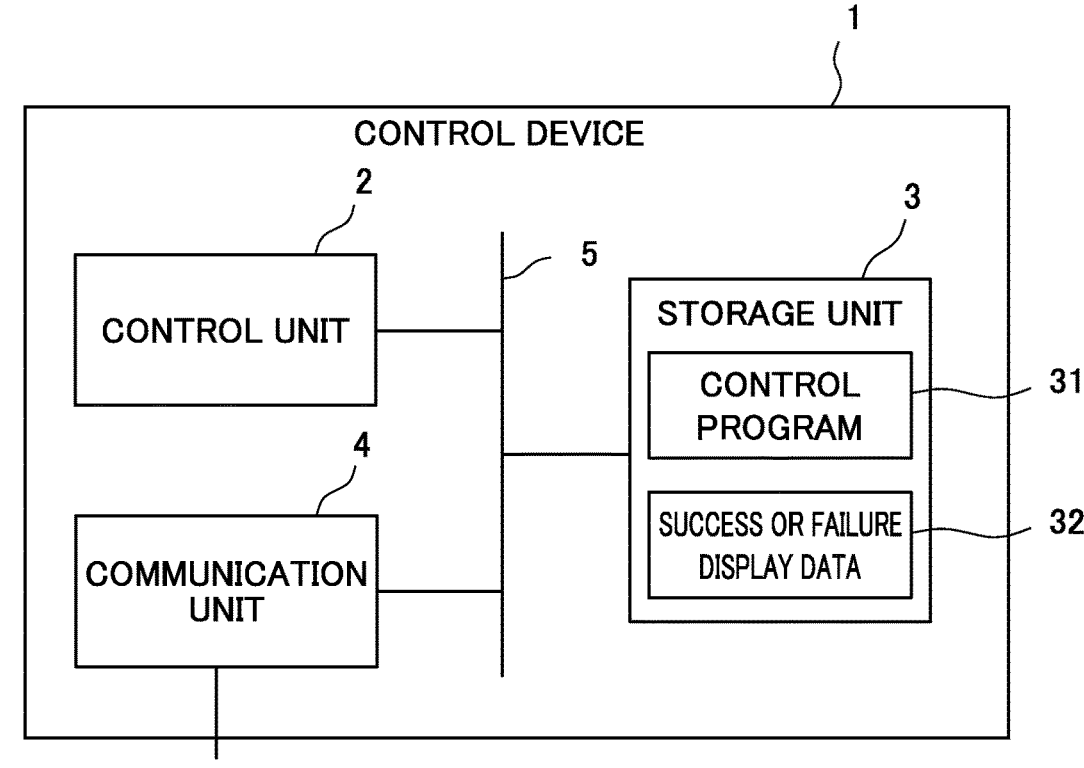
FIG. 2 is a block diagram showing a structure of the control device shown in FIG. 1.

FIG. 2 is a block diagram showing a structure of the control device 1 shown in FIG. 1. The control device 1 shown in FIG. 2 is provided with a control unit 2, a storage unit 3, and a communication unit 4. The control unit 2, the storage unit 3, and the communication unit 4 are connected to each other via a bus 5.

The control unit 2 includes a predetermined processor as a hardware resource. The control unit 2 controls the operation of the electronic device to be controlled by executing the control program. Further, the control unit 2 can execute a rewrite process of rewriting a control program 31 stored in the storage unit 3 into the update program received via the communication unit 4. Note that the update program is received, via the communication unit 4, from a device (for example, the external apparatus EA) existing outside viewed from the electronic device.

The storage unit 3 includes a non-volatile RAM (Random Access Memory) as a hardware resource. The storage unit 3 stores the control program 31. Further, the storage unit 3 includes a success or failure determination result storage area (not shown) for storing success or failure display data 32 indicating the success or failure of the rewrite process.

The communication unit 4 is for communicating with the external apparatus EA with or without a wire. In the present embodiment, the communication unit 4 is interconnected with the external apparatus EA via a communication cable. Further, the communication unit 4 is interconnected with the external apparatus EA via a network such as a LAN (Local Area Network) or a WAN (Wide Area Network). The communication unit 4 receives the update program from outside.

Flow of Processes at the Startup of the Electronic Device

Figure 3:
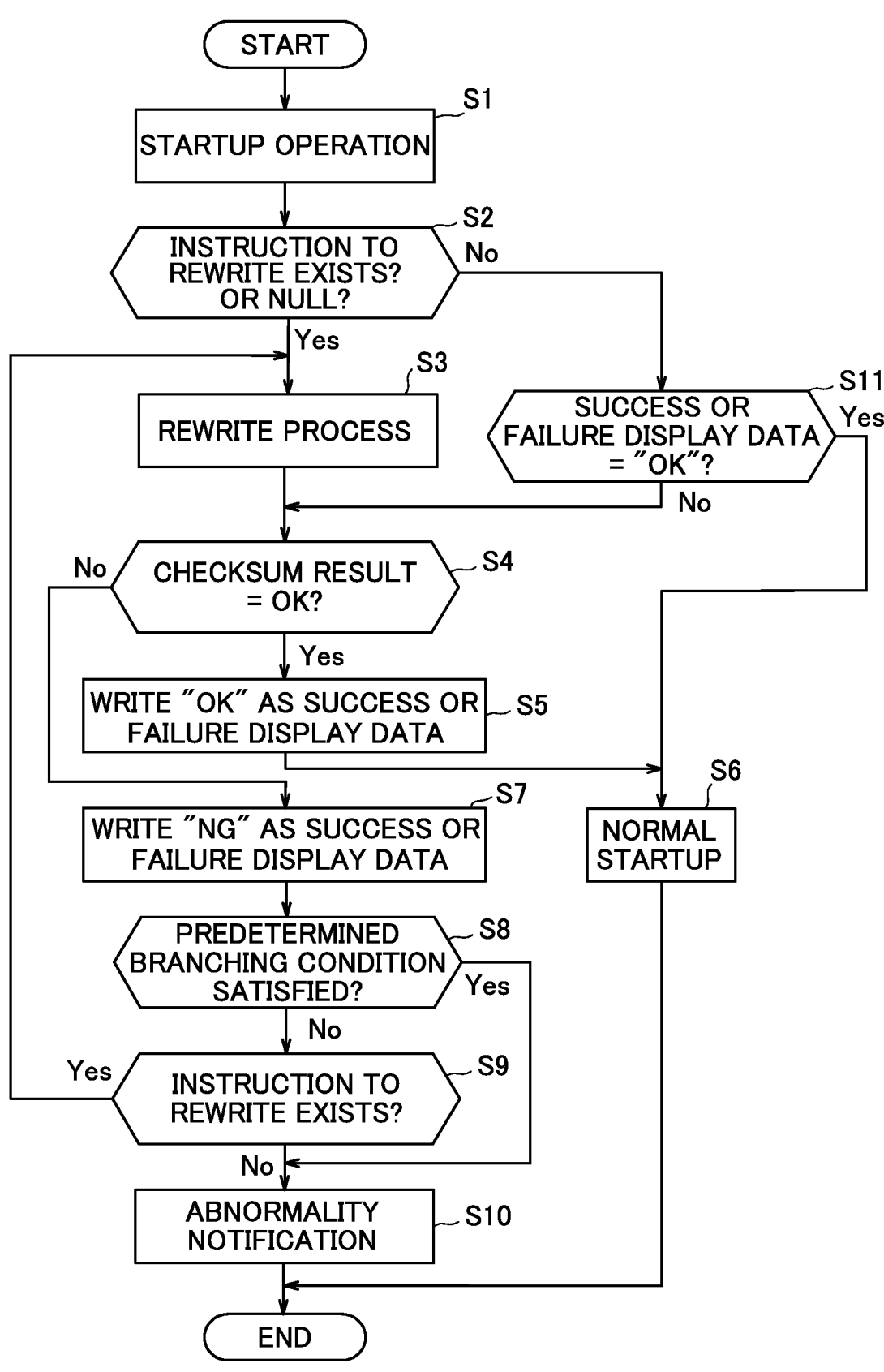
FIG. 3 is a flowchart showing a flow of processes by the control device at the startup of an electronic device according to the present embodiment.

Here, a flow of processes executed by the control device 1 at the startup of the electronic device will be described with reference to FIG. 3. FIG. 3 is a flowchart showing the flow of processes by the control device 1 at the startup of the electronic device according to the present embodiment.

First, the control unit 2 executes a startup operation of the electronic device (step S1). After the end of step S1, the control unit 2 determines whether or not there is an instruction to execute rewriting of the control program 31 stored in the storage unit 3, or whether or not the control program 31 is stored in the storage unit 3 (that is, whether or not the state is null indicating that the control program 31 is not stored in the storage unit 3) (step S2).

If there is the instruction to execute the rewriting of the control program 31 stored in the storage unit 3 or the state is null (Yes in step S2), the control unit 2 executes the rewrite process (step S3). After the end of step S3, the control unit 2 determines the success or failure of the rewrite process. More specifically, the control unit 2 determines whether or not the rewriting of the control program 31 is successful depending on whether or not an output voltage output with respect to an input voltage input to the electronic circuit EC is output at a predetermined numerical value (that is, whether not the result of a checksum="success (OK)" after executing the checksum) (step S4). If the rewriting of the control program 31 is successful (that is, if the output voltage is output at the predetermined value (the checksum result="OK")) (Yes in step S4), the control unit 2 writes "success (OK)", as the success or failure display data 32, into the success or failure determination result storage area (step S5). After the end of step S5, the control unit 2 starts up the electronic device in a normal manner (step S6). After the end of step S6, a series of processes is ended.

Further, if the rewriting of the control program 31 fails (that is, if the output voltage is not output at the predetermined value (the result of the checksum="NG")) (No in step S4), the control unit 2 writes, as the success or failure display data 32, "failure (NG)" into the success or failure determination result storage area (step S7).

After the end of step S7, the control unit 2 determines whether or not a predetermined branching condition is satisfied (step S8). Here, a branch in step S8 is provided in order to prevent the control unit 2 from executing the rewrite process and the process such as the checksum each time the rewriting of the control program 31 fails (that is, an infinite loop). More specifically, the predetermined branching condition includes at least one of "(i) whether the rewrite process has been executed a predetermined number of times at the startup of the electronic device without shifting to the normal startup" or "(ii) whether a predetermined period in time has passed at the startup of the electronic device without shifting to the normal startup". That is, in step S8, the control unit 2 determines whether or not at least one of the above (i) or (ii) is satisfied.

If the above predetermined branching condition is not satisfied (No in step S8), the control unit 2 again determines whether or not there is the instruction to execute the rewriting (step S9). When there is a new instruction to execute the rewriting (Yes in step S9), the control unit 2 returns to step S3 and executes the rewrite process. That is, the control unit 2 grasps that the rewrite process has failed on the basis of the checksum result, and executes the rewrite process again.

If the above predetermined branching condition is satisfied (Yes in step S8) or if there is no new instruction to execute the rewriting (No in step S9), the control unit 2 generates an abnormality notification and presents the abnormality notification to a user (Step S10). Note that the abnormality notification may be a display including character information, drawing information, or the like, or may be a sound for indicating an abnormality.

Further, if there is no instruction to execute the rewriting of the control program 31 stored in the storage unit 3 or the state is not null (that is, the control program 31 is stored in the storage unit 3) (No in step S2), the control unit 2 reads the success or failure display data 32 present in the success or failure determination result storage area, and determines whether or not the rewrite process executed last time has been successful (that is, whether or not the success or failure display data 32="OK") according to the success or failure display data 32 (step S11). If the success or failure display data 32="OK" (Yes in step S11), the control unit 2 proceeds to step S6 and starts up the electronic device in a normal manner. That is, if the success or failure display data 32="OK", the control unit 2 in the present embodiment omits the processes in steps S3 to S10. If the success or failure display data 32="OK" is not the case (that is, if the success or failure display data 32="NG") (No in step S11), the control unit 2 proceeds to step S4, executes the checksum, and grasp the result of the checksum.

Summary

As described above, the control device 1 according to the present embodiment is provided with the control unit 2, the storage unit 3, and the communication unit 4. The control unit 2 controls the operation of the electronic device to be controlled by executing the control program 31. The storage unit 3 stores the control program 31. The communication unit 4 receives the update program from outside. Further, the control unit 2 can execute the rewrite process of rewriting the control program stored in the storage unit 3 Into the update program received via the communication unit 4.

Further, the storage unit 3 includes the success or failure determination result storage area for storing the success or failure display data 32 that indicate the success or failure of the rewrite process.

In the above configuration, after the end of the rewrite process, the control unit 2 determines the success or failure of the rewrite process, and writes the success or failure display data 32 into the success or failure determination result storage area in accordance with the success or failure. Further, the control unit 2 reads the success or failure display data 32 that is written into the success or failure determination result storage area after the startup of the electronic device. When it is determined that the success or failure display data 32 indicates the success of the rewrite process, the control unit 2 executes the control program 31 in lieu of carrying out the rewrite process. In other words, the control device 1 according to the present embodiment can omit the processes in steps S3 to S10 in accordance with the success or failure display data 32. That is, the control device 1 according to the present embodiment can omit the rewrite process and the process such as the checksum in accordance with the success or failure display data 32, thereby making it possible to realize a high-speed startup of the electronic device.

Thus, the control device 1 according to the present embodiment can execute the rewriting of the control program more flexibly while suppressing the delay in the startup due to the confirmation operation for confirming whether or not the rewriting of the control program 31 has been performed in a normal manner. Further, the control device 1 according to the present embodiment can realizes the high-speed startup, without separately preparing a non-volatile memory or the like, by providing the success or failure determination result storage area in the storage unit 3 built therein.

Further, since the control device 1 according to the present embodiment is in a relation of "the startup of the control program 31"="the charging and discharging is enabled" in the battery and power supply field, it is possible to realize the high-speed startup in a system or the like to which an immediate output of an electric power is desired. Further, the control device 1 according to the present embodiment starts up a device in the industrial PC and the server after recognizing that the battery is started up and there is no abnormality in the system attached to the battery. Therefore, if the startup speed of the control program is fast, the startup speed can be accelerated accordingly. Note that in the present embodiment, though a calculated time varies depending on a processing speed of a microprocessor and a volume of the program, it may take about 2 seconds. Therefore, by using the control device 1 according to the present embodiment, it is possible to start the primary processing about 2 seconds earlier, and even if the rewriting of the control program 31 fails, the rewriting can be executed again.

Here, in the above embodiment, the control device 1 is provided in the electronic circuit EC mounted on the electronic device. However, the control device 1 according to the present embodiment is not limited to this. For example, the control device 1 according to the present embodiment may be provided separately from the electronic circuit EC.

Further, in the control device 1 of the present embodiment, a combination of the success or failure display data 32 is a combination that indicates a success in the case of a success and indicates a failure in the case of a failure. However, the control device 1 according to the present embodiment is not limited to this. For example, the combination of the success or failure display data 32 may be a combination that is null in the case of the success and indicates a failure in the case of the failure. Further, the combination of the success or failure display data 32 may be a combination that indicates a success in the case of the success and is null in the case of the failure.

Note that the control device 1 according to the present embodiment is applied to the bidirectional converter as an example. However, the control device 1 according to the present embodiment is not limited to this. For example, the control device 1 according to the present embodiment can be appropriately installed in a circuit such as a charge/discharge control circuit of a battery in addition to the bidirectional converter.

Further, in the present embodiment, the instruction to execute the rewriting of the control program 31 may be transmitted from the external apparatus EA and received via the communication unit 4 when information that triggers the rewriting of the control program 31, such as information on an update of the control program 31 and information on a vulnerability of the control program 31, exist in the external apparatus EA.

Further, in the present embodiment, the checksum may be performed by reading data in a program area, adding all the data, and confirming whether the calculated value is a normal value in order to confirm that the control program 31 has been written in a normal manner.

Further, the wording "a predetermined processor" used in the above description means, for example, a dedicated or general-purpose processor such as a CPU (Central Processing Unit), an MPU (Micro Processing Unit), or a GPU (Graphics Processing Unit), an application specific integrated circuit (ASIC), a programmable logic device (for example, a simple programmable logic device (SPLD) or a complex programmable logic devices (CPLD)), a field programmable gate arrays (FPGA), or the like. Further, each component (each processing circuit) of the present embodiment may be realized not only by a single processor but also by a plurality of processors. Further, a plurality of components (a plurality of the processing circuits) may be realized by the single processor.

Although the embodiment has been described above, the present embodiment is presented as an example and is not intended to limit the scope of the invention. This novel embodiment can be implemented in various other embodiments, and various omissions, replacements, and changes can be made without departing from the gist of the invention. The present embodiment and its modifications are included in the scope and gist of the invention, and are included in the scope of the invention described in the claims and the equivalent scope thereof.

EXPLANATION OF REFERENCE SIGNS

1 Control device
2 Control unit
3 Storage unit
4 Communication unit
5 Bus
EC Electronic circuit
EA External apparatus
The invention claimed is:
1. A control device, comprising:
a control unit configured to control an operation of an electronic device to be controlled by executing a control program;
a storage unit configured to store the control program and success or failure display data; and a communication unit configured to receive an update program from outside the control device,
wherein the control unit is configured to:
in a first step, determine whether the control program is stored in the storage unit and whether instructions exist to rewrite the control program;
in a second step, write an update program received via the communication unit as the control program stored in the storage unit, overwriting a current control program if any exists, in response to:
determining that no control program is stored in the storage unit; or
determining that the instructions to rewrite the control program exist;
in a third step, upon determining that a control program is stored in the storage unit and that the instructions to rewrite the control program do not exist, determine whether the success or failure display data indicates a success or a failure;
in a fourth step, after writing the update program as the control program in the second step or determining that the success or failure display data does not indicate an acceptable control pattern in the third step, test validity of the control program and update the success or failure display data to reflect a positive or negative result of testing the validity of the control program;
in response to the success or failure display data reflecting a negative result:
iteratively repeat the second and fourth steps so long as the instructions to rewrite the control program remain and a branching condition remain unsatisfied, the branching condition constituting one of an elapse of time or a completion of an iteration count limit; and
generate a user notification of an abnormality in the event that the instructions to rewrite the control program do not exist; and
commence startup of the control unit using the control program after executing the fourth step, in response to the success or failure display data reflecting success.
2. The control device according to claim 1, wherein a combination of the success or failure display data is:
a combination that indicates a success in the case of a success and indicates a failure in the case of a failure;
a combination that indicates a success in the case of the success and is null in the case of the failure; or
a combination that is null in the case of the success and indicates a failure in the case of the failure.
3. The control device according to claim 1, wherein the control program is a program that controls charging and discharging of a secondary battery provided in the electronic device.
4. A method for writing or rewriting a control program stored in a storage unit for controlling an operation of an electronic device, the method for writing or rewriting the control program comprising:
a first step of determining whether or not there is an instruction to execute rewriting of the control program;
a second step of overwriting the control program with an updated program in response to:
determining that there is an instruction to execute rewriting of the control program; or
determining that no control program is stored in the storage unit;

a third step, upon determining that the control program is stored in the storage unit and that instructions to execute rewriting of the control program do not exist, of determining whether success or failure data exist indicating a success of a failure;

a fourth step, after writing the update program as the control program in the second step or determining that the success or failure display data does not indicate an acceptable control pattern in the third step, of testing validity of the control program and updating the success or failure display data to reflect a positive or negative result of testing the validity of the control program; and a fifth step of reading the success or failure display data present in the success or failure determination result storage area, wherein, upon a subsequent iteration of the first step after startup of the electronic device, the fifth step is immediately carried out in response to a determination in the first step that there is no instruction to execute the rewrite process, and the control program is executed without passing through a subsequent iteration of the second to fourth steps.

5. The method for rewriting a control program according to claim 4, wherein a combination of the success or failure display data is:

a combination that indicates a success in the case of a success and indicates a failure in the case of a failure;

a combination that indicates a success in the case of the success and is null in the case of the failure; or a combination that is null in the case of the success and indicates a failure in the case of the failure.

6. The control device according to claim 2, wherein the control program is a program that controls charging and discharging of a secondary battery provided in the electronic device.

7. The control device according to claim 1, wherein the control program is a program that controls charging and discharging of a secondary battery provided in the electronic device.

* * * * *